Oct. 29, 1963
L. G. DUMIRE ETAL
3,109,052
CONNECTOR FOR COAXIAL CABLES
Filed April 25, 1961
2 Sheets-Sheet 1
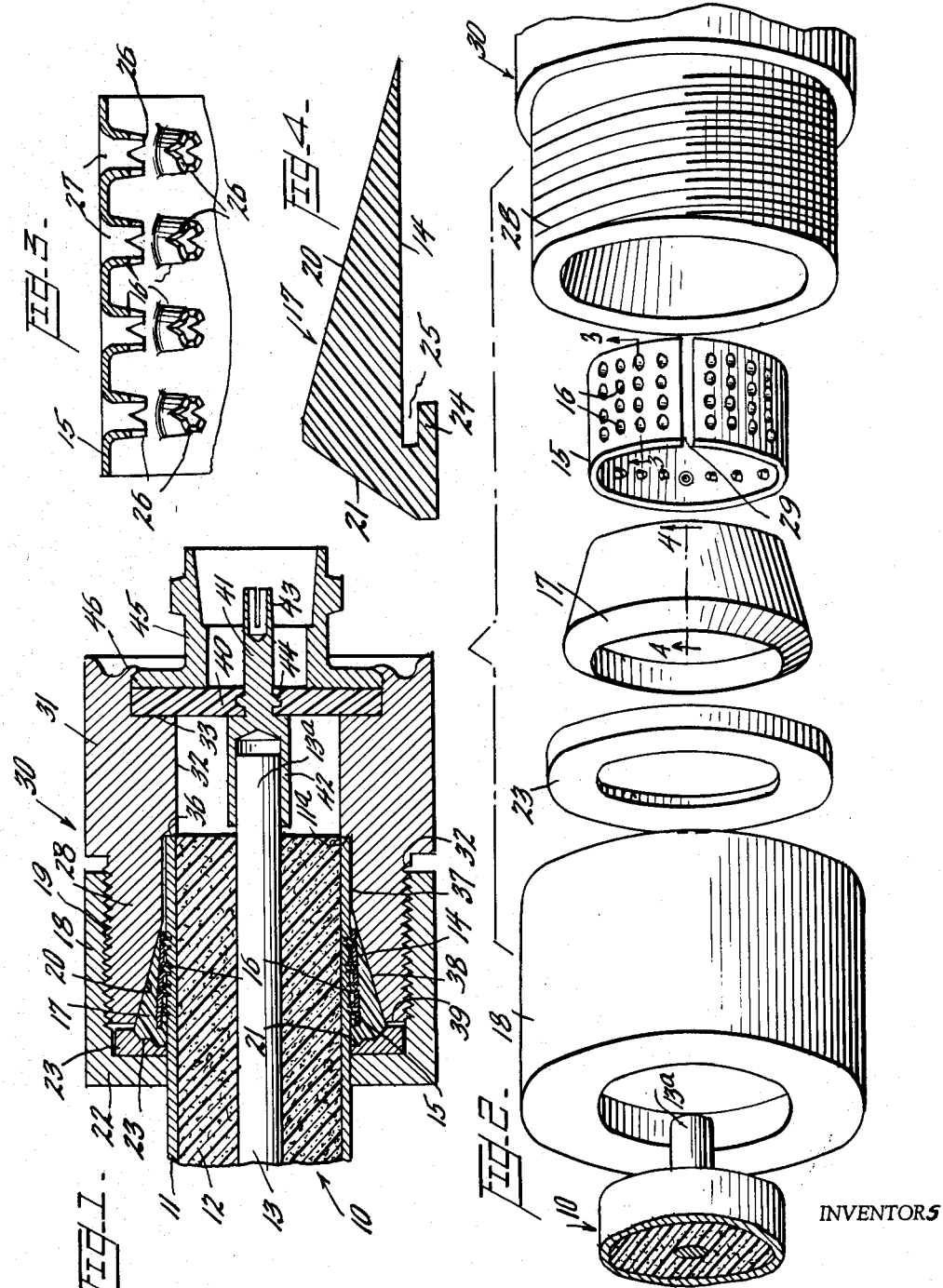
INVENTORS
Leo G. Dumire
George Edlen
BY
Paris, Haskell & Levine
ATTORNEYS

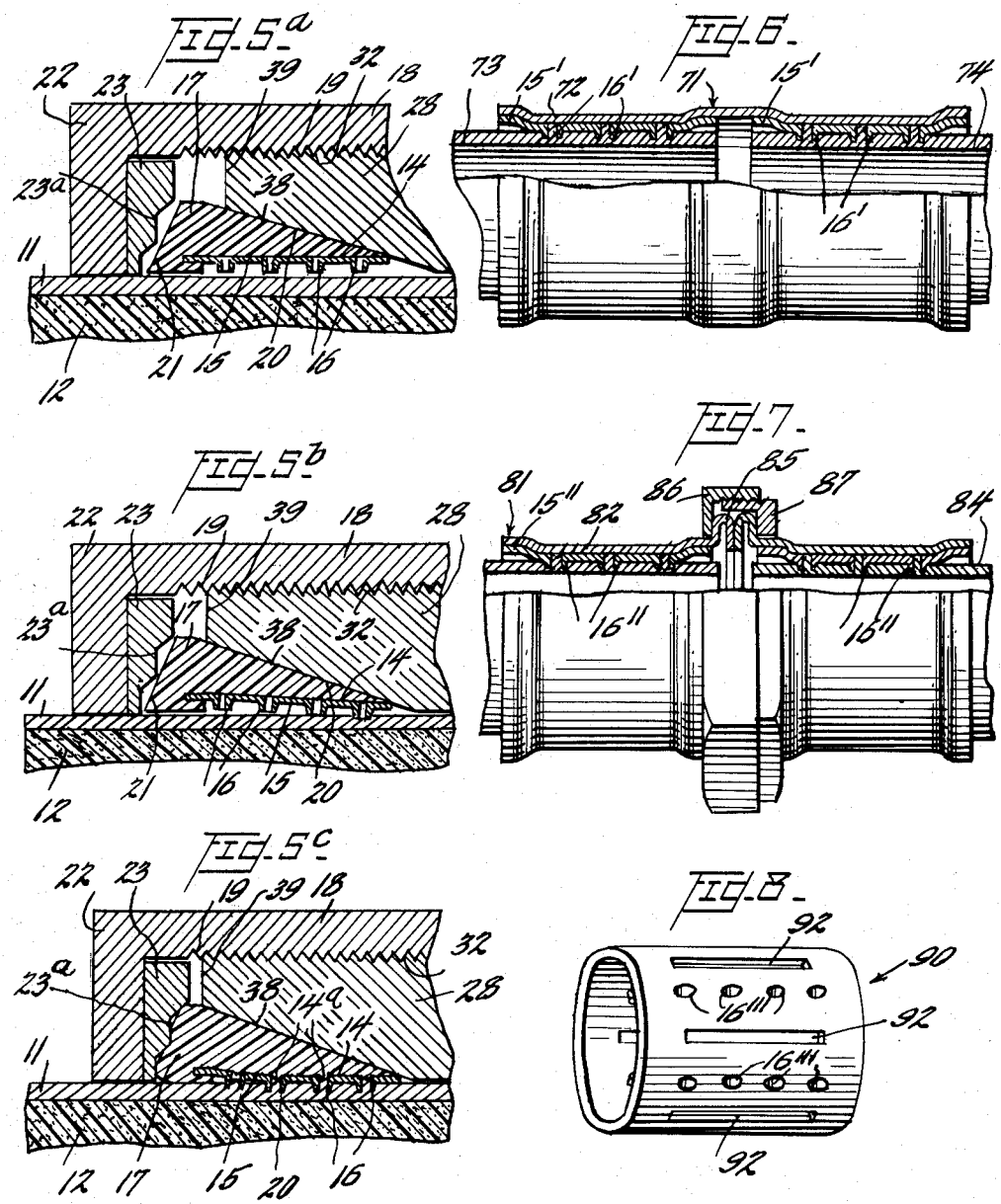

United States Patent Office 3,109,052
Patented Oct. 29, 1963

3,109,052
CONNECTOR FOR COAXIAL CABLES
Leo G. Dumire, Stony Point, and George Edlen, Ossining, N.Y., assignors, by mesne assignments, to Phelps Dodge Electronic Products Corporation, New York, N.Y., a corporation of Delaware
Filed Apr. 25, 1961, Ser. No. 105,384
7 Claims. (Cl. 174—88)

The present invention relates primarily to electrical cable connectors, and particularly to connectors for coaxial cable. However, the present invention more generally relates to the application of fittings and the like to elements formed of malleable material, particularly in the form of cables, pipes, tubes, rods, or hose.

In the electrical transmission cable art there has been a considerable growth in the use of coaxial cables. These cables usually take the form of metal jacketed or braided cable. By metal jacketed cable herein is meant a cable comprising a tubular metal sheath or outer conductor, usually formed of copper or aluminum tubing, within which is housed a center or inner conductor, usually a copper wire or rod, the inner conductor being spaced and insulated from the outer tubing by a suitable dielectric. In the specific case of coaxial cable, this inner conductor is centrally and coaxially spaced and supported from the outer tubing sheath, usually either by dielectric glass or plastic beads, a plastic spiral, a foamed plastic, or other dielectric filler. In the case of braided cable, as distinguished from metal jacketed cable, the above-mentioned sheath or outer conductor is a sleeve of braided wire filaments, and usually the braided sleeve is covered with a plastic insulation sheath.

The advent and growth of coaxial cable and analogous shielded conductors has created special problems of installation. It is obviously desirable in the case of either field or bench installations, but particularly the former, that fittings for the cable be readily and easily applied with simple and conventional hand tools, and that mechanically and electrically reliable applications of fittings be attainable with a minimum of skill. Further, particularly in the instance of high frequency installations, it is of utmost importance that changes in the capacitive relationship between the inner and outer conductors be held to a minimum by the application of the fittings.

The present invention is accordingly primarily concerned with fittings for metal jacketed shielded electrical transmission cables, particularly with metal jacketed coaxial cables, and with the mounting or fastening of these fittings on the cable. The present invention is likewise concerned with the mounting or fastening of fittings on other analogous devices, such as pipes, tubing rods, and hose. A principal aspect of the present invention relates to fastening an anchor or the like to the exterior of the cable, pipe, or analogous device, which anchor can provide the bais of attachment of various fittings and the like to the cable or pipe. Basically, this anchor comprises a sheet metal sleeve having a plurality of internally extending small, sharp, hollow, tubular projections, which are adapted to be embedded in the wall of the pipe, cable, tubing or other structure to which the anchor is to be applied. The bases of the hollow projections are closed, as by a skin or cylinder overlying the exterior of the sleeve. In addition, along at least a portion of their length said hollow projections are formed with completely circumambient walls. This anchor is applied to a metal jacketed coaxial cable (or to a malleable metal pipe, rod, or the like) by being telescopically slipped over the end thereof to a desired location, and radially compressed or crimped thereon, causing the small hollow projections to penetrate or embed in the outer metal jacket of the cable. As the thin walls of the hollow projections penetrate the metal of the cable jacket, these projections become filled with the metal of the cable jacket encompassed by the penetrating walls. Because of the complete circumambient nature of the penetrating walls, and because the bases of the hollow projections are closed, these small hollow projections, now filled with the metal of the cable jacket, become substantially the equivalent of embedded solid projections having the volume described by the overall dimensions of the hollow projections. Thus, while moving only that relatively small amount of cable metal equal to the wall volume of the projections, one obtains substantially the gripping equivalent to embedding solid projections having the overall dimensions of the hollow projections. Embedding such relatively large solid projections would, however, require moving the relatively large amount of cable metal equal to the overall dimensional volume of the projections.

As a result of these features of the present invention, one obtains an exceptionally strong anchor grip by movement of but a very little of the metal of the cable, pipe, rod or other device to which the present anchor may be applied. Consequently, only a small amount of force is required to apply the present anchor, and very little deformation of the cable is suffered, as compared with prior art piercing grip connectors adapted to provide an equivalent anchor grip.

In the specific case of a shielded or coaxial electrical cable, once the anchor is mounted on the cable, it may provide the attachment base for an electrical connector, coupling, or the like, for the cable, adapted to provide separate electrical contact with the outer conductor and with the inner conductor of the cable and mating engagement with a corresponding connector part associated with another electrical device. When applied to pipes, tubing, conduits, or rods in general, the anchor itself may form a coupling or connector member, or it may form the attachment base for conventional coupling elements or fittings.

It is accordingly one object of the present invention to provide an anchor adapted to be affixed to the exterior of a cable, conduit, pipe, tube, hose, or the like, for coupling fittings thereto.

Another object of the present invention is to provide an electrical connector employing this anchor as the basis of union between the connector elements and an electrical cable.

A further object of the present invention is to provide an electrical connector for metal jacketed coaxial cable, employing the foregoing anchor affixed to the outer conductor as the basis of union between the connector elements and the cable conductors.

Still another object of the present invention is to provide an anchor adapted to be affixed to the exterior of conduits, pipes, tubes, rods, hose, or the like, for coupling such devices.

Other objects and advantages of the present invention will become apparent to those skilled in the art from a consideration of the following detailed description of exemplary specific embodiments of the invention, this description being had in conjunction with the accompanying drawings, in which like numerals refer to like or corresponding parts, and wherein:

FIG. 1 is a longitudinal sectional view of a coaxial cable connector embodying the principles of the present invention, and applied to the end of a metal jacketed coaxial cable;

FIG. 2 is an exploded view of the connector and cable shown in FIG. 1.

FIG. 3 is an enlarged fragmentary detailed view of the anchor sleeve taken along line 3—3 of FIG. 2.

FIG. 4 is an enlarged fragmentary detailed view of a resiliently compressible bushing member adapted to overlie the anchor sleeve, taken along the line 4—4 of FIG. 2;

FIGS. 5A–5C are enlarged fragmentary views of the connector of FIG. 1, showing successive stages of application of the anchor assembly to the cable;

FIG. 6 shows a second embodiment of the present invention applied as a pipe or tubing connector;

FIG. 7 shows a third embodiment of the present invention applied as a pipe or tubing connector; and FIG. 8 shows a modified form of anchor sleeve applicable particularly to the embodiments of FIGS. 6 and 7.

In FIGS. 1–5 of the drawings, the present invention is illustrated as an electrical connector applied to the end of a metal jacketed coaxial cable. The cable per se is designated by the numeral 10 and comprises an outer conductor or sheath 11 of malleable metal tubing, such as aluminum, housing an inner conductor 13 formed of copper wire or rod, for example. This inner conductor 13 is coaxially supported within the outer conductor or sheath 11 by means of dielectric 12, which may take numerous forms, but is shown for the purposes of illustration as a foamed plastic dielectric.

In order to couple the connector mechanically to the end of the cable 10 and form effective electrical connections between the two conductors of the cable and their respective connector parts, an anchor is affixed to the outer conductor tubing or sheath 11 adjacent the end of the cable. This anchor comprises the thin-walled sheet metal sleeve 15, having a plurality of perforations forming the inwardly extending, hollow, thin-walled projections 16. Overlying and surrounding the sleeve 15 in a bushing 17, formed from a tough resiliently deformable plastic, such as polyethylene, nylon, or Teflon. Bushing 17 has a forward exteriorly tapered conical surface 20 mating with an internally tapered conical surface 38 on the externally threaded compression member 28. Bushing 17 also is provided with a rearward exteriorly tapered conical surface 21 adapted to abut the washer 23 which in turn is backed by the inwardly extending shoulder 22 of nut 18. The forward surface 23a of washer 23 is internally tapered to conform generally with the rear surface 21 of bushing 17. In addition, said surface 23a is annularly serrated to enable it to obtain a compressive bite on bushing 17, as will be subsequently explained. Threads 19 on nut 18 engage with the threads 32 on compression member 28, whereby threading of nut 18 on member 28 effects a compressional deformation of bushing 17 through the interaction of mating conical surfaces 20 and 38, and surfaces 21 and 23a, to compress the sleeve 15 radially, and cause hollow projections 16 to penetrate and embed in the aluminum sheath 11 of cable 10.

Considering the foregoing anchor assembly in greater detail, sleeve 15 is preferably a sheet metal stamping rolled into tubular form with a longitudinal split at 29. This stamping is formed with a plurality of punches resulting in the inward projections 16. These punches effect a degree of flow of the sheet metal 15, providing the completely circumambient projecting wall sections 27, before the sheet metal is ruptured by the punch to form the sharp pointed serrations 26 at the ends of projections 16.

Rolled stamping 15 is seated within the bushing 17 with its outer circumference completely surrounded by cylindrical wall 14. One end of the sleeve 15 is seated in annular groove 25 formed between annular lip or web 24 and the juxtaposed portion of wall 14. Inwardly shouldered nut 18 is located over bushing 17, with washer 23 interposed between nut shoulder 22 and bushing surface 21, and with threaded section 19 of the nut extending forwardly over the conically tapered portion of the bushing. Compression member 28 is then threaded onto nut 18 by means of external threads 32 cooperating with internal threads 19 to retain the elements in assembled relationship. With the parts thus assembled, the internal diameter of the bushing 17, as well as the internal diameter of the sleeve 15 (including the inward projections 16) are greater than the outside diameter of cable 10 to which this anchor is to be applied, as indicated in FIG. 5A.

Application of the anchor assembly to cable 10 is shown in progressive stages in FIGS. 5A–C. First, the assembly of sleeve, bushing, nut, and compression member, in the relation shown in FIG. 5A, is slipped over the end of the cable 10. Compression member 28 and nut 18 are further threaded onto each other, causing tapered surface 20 of bushing 17 to advance along mating surface 38, sleeve 15 to advance therewith, and resulting in radial compression of the bushing and sleeve until the teeth 26 of projections 16 engage the outer tubing 11 of cable 10, as shown in FIG. 5B. Further threading of nut 18 and compression member 28 causes an axial compressional deformation of bushing 17 under the force of serrated washer 23 and compression member 28, resulting in further radial compression thereof and of sleeve 15. This action continues until most of the projections 16 of sleeve 15 are fully embedded in tubing 11 of cable 10, as shown in FIG. 5C. At the same time, the radial compression of bushing 17 causes annular lip 24 thereof to become tightly seated against the cable sheath 11.

It will be observed in FIG. 5C that most of the hollow projections 16 are now substantially completely filled with the metal of the cable sheath 11. The depth of penetration alone, of course, accounts for most of the filling of the projections 16, however, an additional amount of sheath metal is forced up into the projections as a result of the metal displaced by the penetrating walls of the projections, whereby most of the projections are substantially completely filled up to the bushing tubular wall 14 which now tightly surrounds the sleeve 15. Additionally, as shown in FIG. 5C, the plastic bushing material flows somewhat into the outside portions of the projections, as designated by the numeral 14a. The flow of plastic aids in filling the hollow projections and in effecting a tight seal or capping on the outer ends of the hollow projections, the significance and advantages of which will become apparent from the subsequent description of the invention.

The strength of the grip afforded by the present anchor assembly, with respect to an axial force applied to the assembly relative to the cable, is substantially greater than that which would be provided by only the hollow thin-walled projections 16 of sleeve 15, because these projections are now substantially completely filled with metal; and since the exterior openings of the hollow projections are tightly capped by surface 14 of bushing 17, the filled projections are substantially the equivalent of embedded solid projections having overall dimensions equal to those of the projections 16. It will be noted that the wall portions 27 of projections 16 are completely circumambient; therefore, release of the grip afforded by the embedded projections would require a collapse of the projection walls. However, the filled projections cannot collapse without extruding the contained metal, and this is effectively prevented by the capping surface 14 of bushing 17.

The strength of the present anchor assembly is, therefore, dependent upon the combined cooperating effect of completely circumambient wall portions and closed or capped outer ends of the projections 16. If the projections did not have the circumambient wall portions, an application of force to the anchor assembly, the embedded projections could slide out or become extracted from their embedded positions in outer conductor tubing 11 as they are caused to bend and lie parallel with the outer surface of tubing 11. Similarly, if the outer ends of the projections were not capped or closed, the embedded projections would be collapsed, extruding the contained metal outwardly through the outer openings, again enabling the embedded projections to be extracted as they are caused to collapse and bend and lie parallel with the outer surface of tubing 11. Thus, under either or both of these conditions, the strength of the anchor grip would be dependent only upon the strength of the thin metal stamping from which the anchor sleeve 15 is fabricated; as distinguished from the present invention, wherein the strength of the grip is made substantially equivalent to embedded solid projections having dimensions equal to the overall dimensions of the hollow projections 16. At the same time, application of the present anchor requires a movement of metal in tubing 11 equal only to the volume of the thin walls per se of the projections 16.

Although it is preferred for the purposes of the present embodiment of the invention to leave the outer openings of projections 16 uncapped in so far as the sleeve 15 itself is concerned, and rely upon the bushing 17 to effect the required capping thereof, it is apparent that the sleeve 15 could be fabricated with capped outer ends. Such a structure may be had, for example, by bonding an unperforated sheet metal layer over the outside of sleeve 15.

In FIG. 1 there is shown an exemplary coaxial cable connector 30 applied to the end of coaxial cable 10, which connector is mechanically and electrically coupled to the cable by means of the above described anchor assembly. For this purpose, the cylindrical housing 31 of the connector 30 is formed integrally with the compression member 28, although it is apparent that connector 30 could be a separate element removably attachable to the member 28, if desired. The junction between member 28 and connector housing 31 is formed with an internal cylindrical surface 37 having an internal diameter slightly greater than the outside diameter of cable 10, in order that it may be telescoped over the end of the cable. Cylindrical surface 37 terminates in an inwardly projecting shoulder 36 adapted to abut and make electrical contact with the end 11a of the cable sheath 11. The step of shoulder 36 terminates with the internal cylindrical surface 32 of housing 31 having an internal diameter substantially equal to the internal diameter of the outer conductor 11.

The connector 30 further contains, within the housing 31, a center contact element 41, coaxially mounted relative to the housing internal cylindrical surface 32 by annular dielectric button 40 and the protuberances 44 extending radially from the contact element 41 and embedded in the button 40. On one side of the button 40, the center contact 41 is formed as an elongate tubular socket 42 adapted to receive and make electrical contact with the end 13a of the cable center conductor 13. On the other side of the button 40, the center contact is similarly formed at 43 to receive the center conductor of a coaxial terminal to which the cable 10 is to be connected. A cooperating outer contact member 45 is positioned circumferentially about and coaxially spaced from center contact portion 43, adapted to connect with the outer conductor of the coaxial terminal to which the cable 10 is to be connected. Outer contact 45 may conveniently be retained in the housing 31 by rolling over a retaining lip 46 formed on the housing. In the specific assembly shown, it can be seen that the button 40 is retained in position by being sandwiched between an internal shoulder 33 formed in the housing 31 and the outer contact element 45.

In applying the present connector 30 to cable 10, the cable is first trimmed by cutting away an end portion of the outer conductor 11 and a corresponding portion of the dielectric 12, leaving a squared or flat leading end, and leaving a prescribed length 13a of the center conductor protruding therefrom. An anchor subassembly of sleeve 15, bushing 17, washer 23, and shouldered nut 18 are slipped over the end of the cable 10 and positioned a short distance back of the trimmed end of the cable. The adapter housing 31 is then brought into position over the small protruding portion of the cable by slipping the center contact element 42 over the cable inner conductor portion 13a, and the nut 18 is brought into threaded engagement with the compression member 28. As compression member 28 and nut 18 are threaded together, the bushing 17 and sleeve 15 are compressed radially under the influence of conical washer 23 and surface 38, to lock the anchor assembly to the cable outer conductor 11, as aforedescribed. In so doing, shoulder 36 is drawn into firm butting engagement with end 11a of outer conductor 11. It is preferred that the connector housing shoulder 36 and center contact 42 be brought into engagement with outer conductor 11 and center conductor 13 before nut 18 is completely threaded onto member 28, so that when the anchor assembly becomes locked to cable 10, good electrical contact and a tight mechanical joint between the cable and connector will be assured.

Electrical connection is effected from the outer conductor 11 of cable 10 through the adapter housing 31 to the outer connector element 45, and from the inner conductor 13 of cable 10 through the center contact element 41 to the inner connector element 43. The inner and outer connector elements 43 and 45 may be of various sizes and designs adapted to mate and form electrical and mechanical connection with corresponding inner and outer connector parts associated with the device, system, or cable to which cable 10 is to be connected.

For purposes of illustration, the cable 10 is shown as containing a foamed plastic dielectric 12. Other forms of dielectric center conductor supports for metal jacketed coaxial cable are known and prevalently used. For example, the dielectric support may comprise laminations of polystyrene helically wound on the center conductor 13. In such instance, since a major portion of the dielectric is air or gas, the cable must be gassed to a prescribed or desired pressure after application of the connector in order to maintain uniform electrical characteristics and prevent changes in the gas content and hence in its dielectric constant. For this purpose a port and valve (not shown) may be provided in the wall of adapter housing 31 at any convenient desired location rearwardly of button 40.

It is desirable to provide a gas and vapor seal for the internal chamber of the connector, and, of course, it is essential to seal the connector assembly if the cable 10 is to be gassed in the manner indicated above. This sealing function is performed by the bushing 17. The interface between surfaces 20 and 38 of bushing 17 and compression member 28 is sealed by the compressional forces created in locking the anchor assembly to the cable. Similarly, these forces compress the bushing 17 to form a sealing engagement between lip 24 and the external surface of cablet 10, as best shown in FIG. 5C.

In order to facilitate the application of sufficient force, in applying the connector and anchor assembly to the cable, to effect a suitable gas and vapor seal, as well as to facilitate the embedment of projections 16 into the cable sheath, nut 18 and adapter housing 31 may be provided with suitable flats on their external surfaces to enable effective tightening of the threaded joint therebetween with wrenches, or like tools.

In the transmission of high frequency electrical signals by coaxial cable, it is important that the connector and anchor assembly not deform or alter the internal configuration of the outer conductor 11, for such changes in internal configuration would alter the capacitive relation between the inner and outer conductors and adversely affect the high frequency electrical signal being transmitted. The anchor structure of the present invention is particularly well suited to avoid such undesired internal deformations of the cable, because of the use of thin-walled hollow cable penetrating elements 16, resulting in the movement of very little cable metal during application, and consequently, causing a minimum radial compression force on the cable. This effect is quite marked in comparison to the application of an anchor utilizing solid penetrating elements of a size equivalent to that of the present hollow penetrating elements. Additionally, the present anchor assembly contains a built-in protection against over tightening. Once the projections 16 have been fully embedded in the cable, the force of continued tightening efforts is distributed over substantially the entire area of the sleeve 15, rather than being localized over a small area, and, therefore, has little effect on the cable. This protection feature provides a sufficient margin of safety to enable the projections 16 to be fully embedded in the cable sheat 11 without fear of deleterious over tightening, thereby insuring that every connector applied to a cable is anchored to the full measure of the anchor's gripping potential without concern of significant cable deformation.

Additional embodiments of the present invention, particularly suited for coupling ordinary metal pipes, tubing, electrical conduits, and the like, are shown in FIGS. 6, 7, and 8.

In FIG. 6, two sections of metal tubing 73 and 74 are coupled together by means of a cylindrical housing 71 containing two anchor sleeves 15', each identical to anchor sleeve 15 in FIGS. 1–5. Housing 71 is originally formed with a uniform diameter. An anchor sleeve 15' is located within the housing adjacent each end, and preferably bonded thereto. The internal size of the housing 71 with the anchor sleeves 15' is chosen to be slightly greater than the external size of the tubing sections 73 and 74. The housing is telescoped over an end of tubing section 73 and then necked down at 72, as by circumferential crimping of the housing 71, to embed the hollow projections 16' in the wall of tubing section 73, with the same effect as described above with respect to the coaxial cable connector of FIGS. 1–5. The other end of housing 71 is then applied over an end of tubing section 74 and similarly necked down. There is thus provided a coupling between tubing sections 73 and 74 whose axial strength is derived from anchors 15', and whose transverse strength is derived from housing 71.

In FIG. 7, two sections of metal tubing 83 and 84 are coupled together by means of two coupling elements. Each coupling element comprises a cylindrical housing element 81 which is lined with an anchor sleeve 15", preferably bonded thereto. Anchor sleeve 15" is substantially identical to anchor sleeve 15' of FIG. 6. One coupling element is applied to tubing section 83 by being telescoped over the end thereof and necked down, as by circumferential crimping, at 82. The housing 81 in this embodiment is provided with a flange 85 intended to be located slightly beyond the end of the tubing section 83. An identical coupling element is similarly applied over the end of the other tubing section 84. The two tubing sections are then coupled by threading together the two internally shouldered nuts 86 and 87 engaging the flanges 85, and thus drawing the flanges, coupling elements, and tubing sections together.

As will be apparent to those skilled in the art, seals or gaskets may be provided in either of the embodiments of FIGS. 6 and 7 if the tubing sections are intended to carry fluid material.

Although numerous modes and forms of crimping the connector elements of FIGS. 6 and 7 are known, it has herein been suggested as preferred that the attaching crimps be circumferential to effect a uniform or nearly uniform necking down of the coupling elements. For this purpose one may employ such tools as are disclosed, for example, in the U.S. Patent 2,952,175 to George Edlen and Leo G. Dumire, and in U.S. Patent 2,009,829 to Selden T. Williams.

In the form of the invention shown in FIGS. 6 and 7, the anchor sleeves 15' and 15" may be complete annular sleeves, or axially split sleeves as in FIGS. 1–5, and they may be bonded to housing elements 71 and 81 or not, as desired. However, it is suggested that the crimping operation will be facilitated by utilizing an anchor sleeve 90, as shown in FIG. 8. This form of anchor sleeve is a complete cylinder, including axially extending slots 92 circumferentially spaced about the sleeve. The webs between the slots 92 carry the inwardly extending hollow projections 16'''. The slots 92 facilitate the circumferential contraction of the sleeve 90 under a circumferential crimping force. Thus, when anchor sleeve 90 is substituted for sleeves 15' and 15" in FIGS. 6 and 7, it is preferred that the sleeve 90 not be bonded to the housing elements 71 or 81, except possibly at the ends of the sleeve 90, in order not to defeat the purpose of slots 92 in facilitating the crimping operation.

Having thus presented several specific embodiments of the preesnt invention, it will be appreciated that this invention encompasses a novel means for anchoring a connector to a coaxial cable, and further includes a novel combination of coaxial cable and connector employing this anchoring means. In its more general aspects, the invention provides a novel means for anchoring a fitting or the like to any cable, pipe, rod, tube, or hose whose outer surface is malleable, and in view of the novel co-operation between the anchoring means and the cable, pipe, etc., the invention embodies a novel combination therebetween. The instant specific embodiments are presented solely as exemplary of the invention in order to facilitate a complete understanding thereof. Since numerous variations and modifications will be apparent to those skilled in the art, it is apparent that the invention is not limited to the disclosed specific embodiments, and such modifications and variations as are embraced by the spirit and scope of the appended claims are contemplated as within the purview of the present invention.

What is claimed is:

1. An electrical connector for cables of the type having a first conductor, a second conductor surrounding said first conductor, and insulation means supporting said first conductor in spaced relation to said second conductor interiorly thereof, comprising in combination: an anchor assembly adapted to be affixed over the cable adjacent an end thereof, including an anchor sleeve, a radially compressible bushing overlying and housing said sleeve and having an exterior tapered surface, a compression member having an interior tapered surface mating with and overlying said bushing surface, and means for drawing said surfaces toward each other to compress said bushing and thereby radially compress said sleeve; said sleeve having a plurality of perforations providing a plurality of inwardly extending hollow projections having completely circumambient wall portions adapted to be embedded in said second conductor on compression of said sleeve over said cable, said bushing having an inner surface overlying and capping said perforations; and an electrical contact assembly carried by said anchor means including an annular internal shoulder adapted to abut and make electrical contact with the end of said second conductor, and second contact means adapted to make electrical contact with said first conductor, said two contact means being further formed to provide electrical contact with an electrical device, whereby said two contact means may provide an electrical connection between an end of said cable and said device.

2. An electrical connector as set forth in claim 1, wherein said bushing has an annular recess stepped inwardly from and extending parallel with said inner surface receiving one end of said sleeve.

3. An electrical connector as set forth in claim 2, wherein said electrical contact assembly is integral with said compression member.

4. An electrical connector for cables of the type having a first conductor, a second conductor surrounding said first conductor, and insulation means supporting said first conductor in spaced relation to said second conductor interiorly thereof, comprising in combination: an anchor assembly adapted to be affixed over the cable adjacent an end thereof, including an anchor sleeve, a compression sleeve overlying said anchor sleeve, and means for radially compressing said compression sleeve and thereby radially compressing said anchor sleeve, said anchor sleeve having a plurality of perforations providing a plurality of inwardly extending hollow projections having completely circumambient wall portions adapted to be embedded in said second conductor on compression of said anchor sleeve over said cable, said compression sleeve having an inner surface overlying and capping said perforations; and an electrical contact assembly carried by said anchor means including a first contact means adapted to make electrical contact with one of said conductors, and a second contact means adapted to make electrical contact with the other of said codnuctors, said two contact means being further formed to provide electrical contact with an electrical device, whereby said two contact means may provide an electrical connection between an end of said cable and said device.

5. An electrical connector as set forth in claim 4, wherein said compression sleeve is a resiliently deformable plastic sleeve.

6. In combination: an electrical cable having a metallic first conductor, a metallic second conductor surrounding said first conductor, and insulation means supporting said first conductor in spaced relation to said second conductor interiorly thereof; and an end connector therefor comprising an anchor assembly telescoped over the cable and affixed thereto adjacent an end thereof, and an electrical contact assembly carried by said anchor assembly; said anchor assembly including an anchor sleeve overlying said second conductor, a compression sleeve overlying said anchor sleeve, and means placing said two sleeves under radial compression, said anchor sleeve having a plurality of perforations providing a plurality of inwardly extending hollow projections having completely circumambient wall portions embedded in said second conductor and filled with the metal thereof, said compression sleeve having an inner surface overlying and capping said perforations; said electrical contact assembly including a first contact means making electrical contact with one of said conductors, and a second contact means making electrical contact with the other of said conductors, said two contact means being further formed to provide electrical contact with an electrical device, whereby said two contact means may provide an electrical connection between an end of said cable and said device.

7. In a combination as set forth in claim 6, said compression sleeve having an external tapered surface, a compression member having an internal tapered surface mating with and overlying said compression sleeve tapered surface, said means placing said two sleeves under radial compression comprising means for drawing said two tapered surfaces toward each other.

References Cited in the file of this patent

UNITED STATES PATENTS

| | | |
|---|---|---|
| 2,250,280 | Starbird | July 22, 1941 |
| 2,279,794 | Olson | Apr. 14, 1942 |